UNITED STATES PATENT OFFICE.

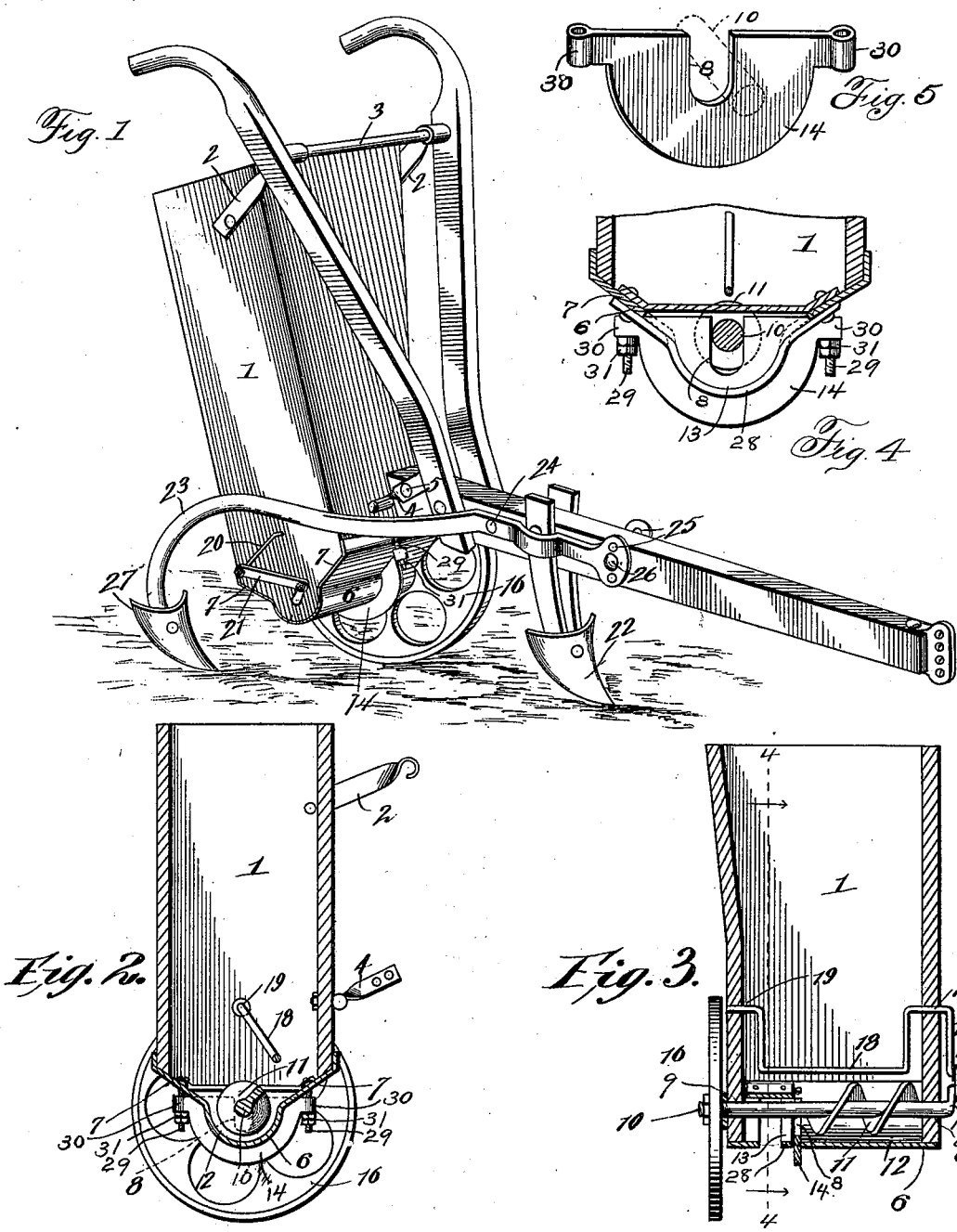

FRANKLIN CLARKE DAVIS, OF TOCCOA, GEORGIA.

COTTON-PLANTER AND FERTILIZER-DISTRIBUTER.

SPECIFICATION forming part of Letters Patent No. 652,914, dated July 3, 1900.

Application filed February 8, 1900. Serial No. 4,519. (No model.)

*To all whom it may concern:*

Be it known that I, FRANKLIN CLARKE DAVIS, a citizen of the United States, residing at Toccoa, in the county of Habersham and State of Georgia, have invented a new and useful Cotton-Planter and Fertilizer-Distributer Attachment, of which the following is a specification.

My invention is an improved cotton-planter and fertilizer-distributer attachment for plows; and it consists in the peculiar construction and combination of devices hereinafter fully set forth, and particularly pointed out in the claims.

The object of my invention is to provide a cotton-planter and fertilizer-distributer attachment adapted to be attached to and to operate in conjunction with a shovel or other suitable form of plow, which shall be cheap, of simple construction, and adapted to operate efficiently for the purpose of planting cotton-seeds and distributing fertilizers in connection with the planting thereof and separately.

In the accompanying drawings, Figure 1 is a perspective view of a cotton-planter and fertilizer-distributer attachment embodying my improvements, showing the same in operative relation to a furrow opening and covering plow. Fig. 2 is a vertical sectional view of the same detached from the plow. Fig. 3 is a similar view on a plane at right angles to Fig. 2. Fig. 4 is a detail sectional view, on a somewhat-enlarged scale, of a portion of the bottom plate, showing the discharge-opening formed therein, the vertically-movable cut-off plate to regulate the discharge of seeds and fertilizer from the seedbox, and also showing the guard which bears against the outer side of the cut-off plate. Fig. 5 is a detail view of the cut-off plate.

In the embodiment of my invention I employ a combined fertilizer and seed box 1, which is preferably of the form here shown and of a suitable size to adapt the same to be readily attached to and detached from a cultivating or other suitable form of plow, as shown in Fig. 1, for which purpose I provide the said box 1 with suitable hooks 2 at its upper end on opposite sides to engage the round 3, connecting the plow-handles, and I further provide one or more metallic strap-links 4 near the lower end of the box 1 on the front side thereof, adapted to be bolted to the plow-beam, as at 5, hence disposing the box 1 in rear of the plow-beam and behind the plow-handles.

The lower end of the box 1 is closed by a bottom plate 6, the sides of which are preferably downwardly inclined, as at 7. Bearings are formed at the lower sides of the box, as at 9, in which bearings are journaled a transversely-disposed operating-shaft 10, provided with a feed-worm 11, the latter being arranged above and in proximity to the depressed transverse semicylindrical channel 12, formed in the bottom plate 6. A discharge-opening 13, formed in the bottom plate, is at one end of the feed-worm adapted for the discharge of the cotton-seed and fertilizer. The cotton-seed and fertilizer may be commingled before introducing them to the seedbox or they may be used separately, the machine being adapted for discharging either cotton-seed or fertilizer, or both, as will be understood. An adjustable cut-off plate 14 is disposed transversely with relation to the bottom plate 6, is located across the discharge-opening thereof, and has a discharge-opening 8 formed in its upper side, in which discharge-opening operates the shaft 10. Adjusting-bolts 29 depend from the inclined upper portions of the bottom plate 6 and operate in lugs or ears 30, formed at the ends of the cut-off plate, and by turning the adjusting-nuts 31 on said bolts the cut-off plate may be adjusted vertically to enlarge or reduce the size of the discharge-opening therein, as may be required, so as to control the discharge of the seed and fertilizer by the feed-worm. On the outer side of the cut-off plate is a guard 28, which is secured transversely on the bottom plate 6 and bears against the said cut-off plate and serves to brace the same and form a guide therefor and prevent the said cut-off plate from being laterally displaced by the action of the feed-worm on the seeds and fertilizer.

On one end of the shaft 10 is fixed a wheel 16, which operates by frictional contact with the earth and serves to impart rotary motion to the shaft and feed-worm. Said shaft is provided at the end opposite the wheel 16 with a crank 17. An oscillating stirrer 18 is disposed transversely in the box 1 near the lower side thereof and is journaled therein, as at 19, said stirrer being of substantially U shape and provided with an exterior crank-arm 20. Said crank-arm is connected with the crank 17 of the operating-shaft by a link 21, and it follows that when said shaft is rotated oscillating motion is imparted to the stirrer 18, which serves to prevent the mass of fertilizer and cotton-seeds in the box from packing therein and to adapt the same to be discharged regularly through the discharge-opening by the feed-worm.

As shown in Fig. 1, the plow is provided with a suitable furrow-opening shovel or share, as at 22, and arms 23, which diverge rearwardly from the plow-beam and are disposed on opposite sides of the box 1, are pivoted to the plow-beam by a bolt 24. Said arms are provided with forward extensions beyond their pivots which bear on the sides of the plow-beam, and at their front ends have a series of adjusting-openings 25, which adapt them to be adjusted vertically and secured at any desired adjustment by a bolt 26, which passes through the plow-beam and is adapted to be passed through appropriate adjusting-openings. The arms 23 constitute plow-stocks and are provided with suitable covering shovels or shares 27, which are adapted to cover the furrow made by the shovel or share 22 after the seeds and fertilizer have been deposited in said furrow by my improved attachment hereinbefore described.

Having thus described my invention, I claim—

1. A planting attachment for plows, comprising a seedbox adapted for attachment to the rear side of a plow, in combination with a shaft journaled in said seedbox and having a feed-worm, a crank, and an operating-wheel, the latter being adapted for rotation by contact with the ground as the plow advances, an oscillating stirrer in said seedbox and having an exterior crank-arm, and a link connecting said crank-arm to the crank of the wheel-shaft, substantially as described.

2. In a planter, the seedbox having the bottom plate forming a channel, said channel having a transversely-disposed discharge-opening near one end thereof, a vertically-adjustable cut-off plate disposed in the said opening, said cut-off plate having a discharge-opening in its upper side and means to adjust said cut-off plate vertically, in combination with a shaft journaled in bearings with which the box is provided, said shaft being disposed in said channel of said bottom plate and having a feed-worm therein, and extending through the discharge-opening in the upper side of the cut-off plate and means to rotate said shaft, substantially as described.

In testimony that I claim the foregoing as my own I have hereto affixed my signature in the presence of two witnesses.

FRANKLIN CLARKE DAVIS.

Witnesses:
JOHN T. CARTER,
WILL CARTER.